Sept. 2, 1958 H. H. CLARK 2,850,277
STRIP ALIGNING APPARATUS
Filed Oct. 20, 1955 2 Sheets-Sheet 1

INVENTOR.
HAROLD H. CLARK
BY
R. L. Miller
ATTORNEY

Sept. 2, 1958   H. H. CLARK   2,850,277
STRIP ALIGNING APPARATUS
Filed Oct. 20, 1955   2 Sheets-Sheet 2

INVENTOR.
HAROLD H. CLARK
BY
ATTORNEY

United States Patent Office 2,850,277
Patented Sept. 2, 1958

2,850,277

STRIP ALIGNING APPARATUS

Harold H. Clark, Cuyahoga Falls, Ohio, assignor to The Goodyear Tire & Rubber Company, Akron, Ohio Application October 20, 1955, Serial No. 541,737

4 Claims. (Cl. 271—2.6)

This invention relates to a strip or web aligning apparatus and more particularly to an apparatus for depositing a continuous length of strip material such as extruded unvulcanized rubber or rubberized fabric on a moving surface in a predetermined position preparatory to subsequent operations thereon.

In the manufacture of rubber products, many steps are taken in preparing the component parts that go into the finished products. In numerous instances, the material is in strip or web form at some stage of the preparation. The strips or webs of material are difficult to handle because of lack of rigidity and the ease with which they may be distorted. As a result, the usual aligning mechanisms will not function satisfactorily in depositing strips of this material on a moving surface because the forces are applied to the strip in localized areas rather than distributed over a substantial portion thereof.

A particularly difficult strip to handle is a continuous strip of unvulcanized extruded tread stock for tires as it is not of uniform cross-section across its width and due to the nature of the material, the known aligning mechanisms are not applicable for use with unvulcanized rubber tread stock. The thin edge portions of the tread stock will be distorted when it is drawn over rolls or fed over and under bars to align the strip. It is imperative that the tread be free from distortion when it is applied to the carcass. To prevent such distortion, a substantial portion of the strip must be moved simultaneously to change the position of the strip.

In order to minimize the effects of the tread splice in the finished tire, it has been considered desirable to cut or skive the tread to the proper length so that the splice angle in the finished tire is at a substantial angle with the circumference of the tire. This distributes the splice over a substantial portion of the periphery of the tire rather than across the tire at one point. In order to have such a splice, the skive of the tread stock must be made at a substantial angle with the edge of the extruded tread and thereby it is essential that the edge of the strip of tread stock be accurately positioned with respect to the conveyor belt of the skiving machine. If not, each cut or skive would not be at the same angle with the edge of the tread so that the ends would not be parallel and could not be properly joined upon application to the tire carcass.

In some instances, a continuous strip of rubberized fabric is processed on a lay-up table or the like where a thin layer of cushion stock is applied to the fabric strip. The layer of cushion stock may be of a width less than that of the fabric so that it is laid on the fabric with a predetermined margin. If the placing of the cushion is to be accurately done, it is essential that the fabric strip always be placed on the lay-up table in precisely the same position, otherwise the marginal spacing would not be consistent.

Manipulation without distortion of webs of material such as these may be made by moving a relative large portion of the web at one time. In this manner, the forces are distributed and at any particular point are not sufficient to create harmful distortions. It is therefore an object of this invention to provide an apparatus that will accurately deposit a strip of unvulcanized rubber material or rubberized fabric on a moving surface in a predetermined position without distortion of the strip.

Another object of the invention is to provide a simple and inexpensive apparatus to align a strip of material within close tolerances as it passes from one conveying system to another.

A further object of this invention is to provide an alignment device that will function accurately in continuous operation.

A still further object of the invention is to provide an apparatus that operates in coordination with the apparatus that performs the subsequent operations of the strip material.

Other objects and advantages of this invention will become apparent hereinafter as the description thereof proceeds, the novel features, arrangements and combinations being clearly pointed out in the specification as well as in the claims thereunto appended.

Figure 1:
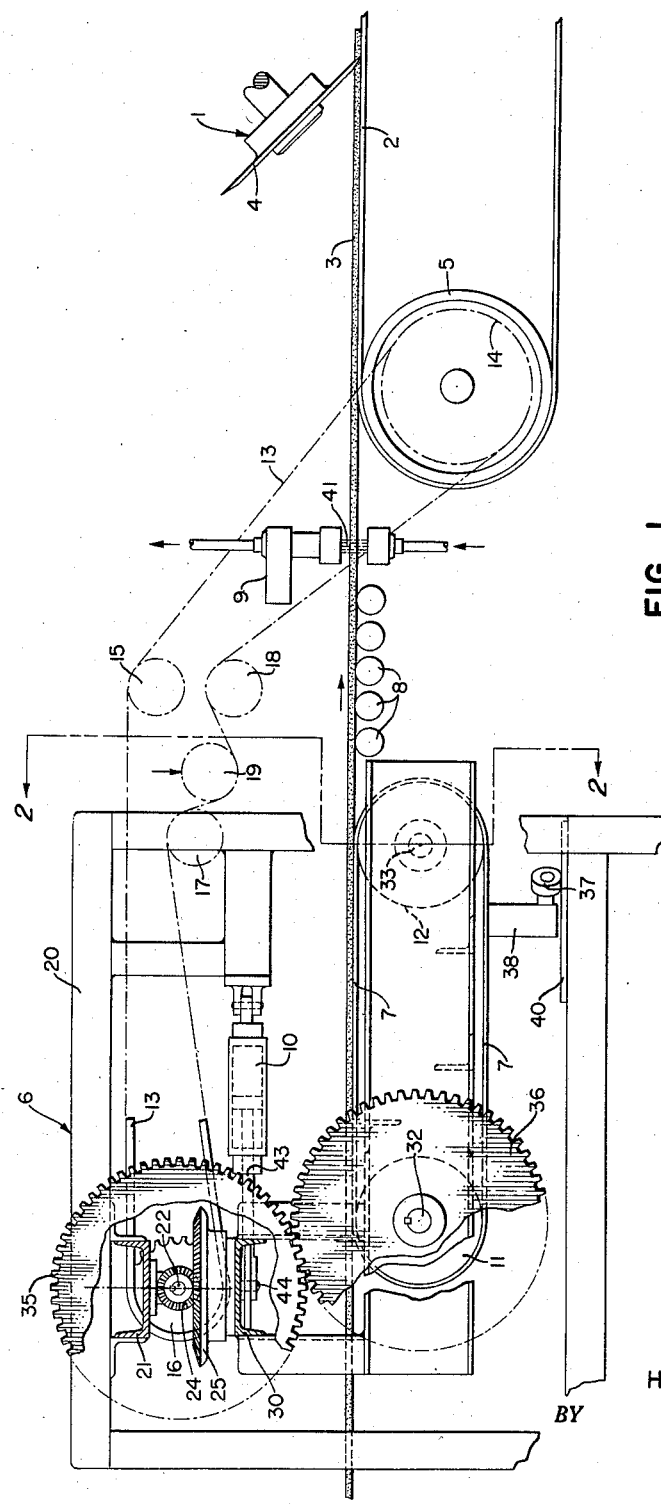
Fig. 1 is a front elevation of the invention showing its position with respect to a skiving machine.

For purposes of illustration, the invention will be described in combination with a tread skiving machine which is well known in the art. In the usual skiving machine operation the extruded tread stock is carried by a conveyor through tanks of water for cooling after it leaves the extruder. Subsequently the strip of stock is transferred then to the conveyor belt of the skiving machine or skiver which carries the strip through the machine under one or more cutting blades which skive the strip into lengths of predetermined size. Since the length of travel during cooling is substantial and no attempt is made to position the strip of material accurately, the strip is not transferred at all times to the conveyor of the skiver in a sufficiently accurate and straight line position to be properly skived. These lengths are removed and stored until they are to be applied to the tire carcass during the tire building operation.

The numeral 1 represents a skiver or skiving apparatus of the usual construction having a conveyor belt 2 which supports and carries the strip 3 of extruded unvulcanized rubber tread material through the apparatus 1. The revolving knife 4 automatically skives the tread stock 3 at a predetermined point as it passes through the apparatus as is well known in the art. The belt 2 of the skiver is supported on one end by the pulley 5 which may be moved relative to the other pulley (not shown) of the skiver so as to provide means to adjust the tension in the belt 2.

Adjacent to the skiver 1 the web aligning apparatus 6 of this invention is mounted so that the conveyor belt 7 of the aligning apparatus 6 is in substantial longitudinal alignment with the belt 2 of the skiver 1. The strip 3 of unvulcanized rubber tread stock enters the aligning apparatus 6 from the cooling tanks (not shown) and is carried through the aligning apparatus 6 on the upper reach of the belt 7. The position of the strip 3 as it is placed on the belt 7 from the cooling tanks is not specifically controlled so that it may vary considerably. The belt 7 of the aligning apparatus is driven preferably at substantially the same peripheral speed as the belt 2 of the skiver. If desired, a series of idler rolls 8 may be interposed between the skiving apparatus 1 and the aligning apparatus 6 to prevent undue sagging of the strip 3 as it passes between the machines.

In order to deposit the unvulcanized rubber strip 3 on the belt 2 of the skiving apparatus in the predetermined position, means are provided to automatically change the relation of the longitudinal axis of the belt 7 of the aligning apparatus with respect to that of the belt 2 of the skiver. As the belt 7 moves out of alignment, the section of the strip 3 on the belt 7 approaches the belt 2 of the skiver at an angle such that the strip 3 will continue to be deposited on the belt 2 at the predetermined position. The dotted lines in Fig. 3 indicate the out of alignment position. Between the aligning apparatus 6 and the skiver 1 a sensing mechanism or detector 9 is positioned so that, as shown, the edge of the strip 3 of material passes through the sensing mechanism. It is to be understood that if desired the sensing mechanism 9 may be positioned so that other portions of the strip will activate it. As the edge of the material moves from the predetermined position the sensing mechanism 9 is activated, which in turn actuates an oil cylinder 10 to move the aligning apparatus 6 so as to keep the edge of the strip of material 3 at the desired position.

Figure 2:
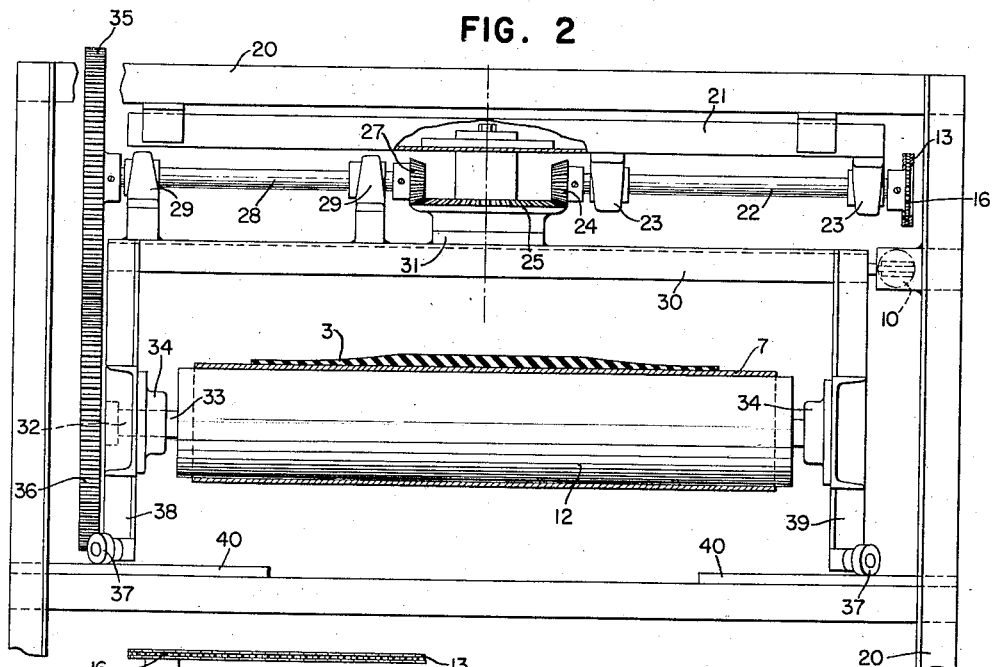
Fig. 2 is an end view of the invention.
Figure 3:
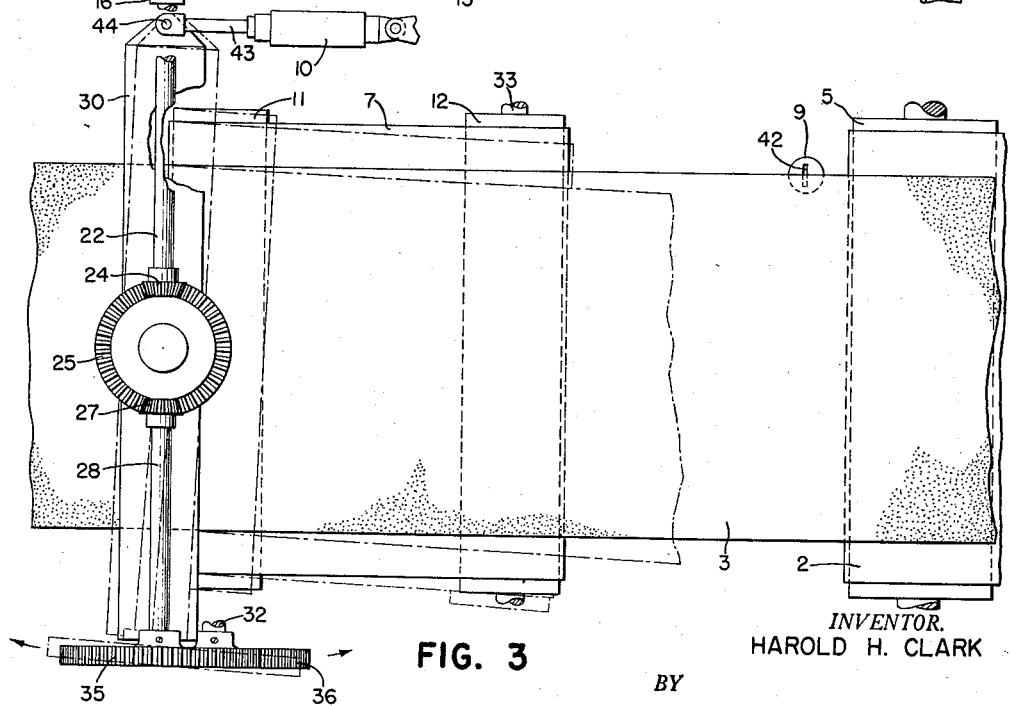
Fig. 3 is a plan view.

In order to more fully understand the operation of the aligning apparatus 6 in Figs. 1, 2 and 3 the belt 7 is supported by rolls 11 and 12 to form the conveying system of the aligning apparatus. One means that may be readily used to drive the belt 7 at the same speed as the belt 2 of the skiving apparatus is a chain drive from the shaft on which pulley 5 of the skiver is mounted. The chain 13 passes around a sprocket gear 14 affixed to the shaft of the pulley 5, over the idler 15, around the sprocket gear 16, then over idlers 17 and 18. A take-up idler sprocket 19, between idlers 17 and 18, retains the proper tension in the chain when the pulley 5 of the skiver is moved in order to adjust the tension of the belt 2 of the skiver.

As best seen in Figs. 2 and 3, a base structure 20 includes a top cross member 21 carrying a shaft 22 supported by bearings 23 attached to the cross-member 21. The sprocket gear 16 keyed to the outer end of the shaft 22 is, as previously explained, driven by a chain 13 drive extending from the sprocket 14 of the skiver. On the opposite end of shaft 22, a bevel gear 24 is affixed and engages a ring gear 25 rotatably attached to the top cross-member 21. Diametrically opposite the normal position of bevel gear 24 on the ring gear 25, a second bevel gear 27 engages the ring gear 25. This bevel gear 27 is attached to shaft 28 supported on bearings 29 attached to the framework 30. As shown, the ring gear 25 also is supported for free rotation on thrust bearing 31 on a cross-member of framework 30. The attachment of the ring gear 25 to both the base 20 and framework 30 allows limited relative movement between them. The rolls 11 and 12 are carried on shafts 32 and 33 respectively supported in bearings 34 attached to the framework 30. On the outer end of the shaft 28, a gear 35 is attached thereto which engages gear 36 attached to the shaft 32 of the roll 11. Since the framework 30 is pivotally attached to the base 20 through the ring gear 25, it may be moved independently of the base 20 without interrupting the drive of the belt 7. The vertical center line of the ring gear 25 is the axis about which the framework 30 pivots. It is apparent that by the proper selection of sprocket sizes for the sprockets 14 and 16, the belt 7 on the aligning apparatus may be driven at the same speed as belt 2 of the skiver. As the longitudinal axis of the belt 7 is moved out of alignment with the longitudinal axis of the belt 2 of the skiver, position of the bevel gear 27 changes on the ring gear 25 but the bevel gear 27 is still driven thereby. The shaft 22 remains fixed with respect to the base 20 and top frame member 21, but the position of the shaft 28 and the framework 30 with its component parts changes.

So that the framework 30 which supports the rolls 11 and 12 may readily move about the pivot (indicated by broken lines in Figs. 1 and 2) the framework 30 is supported on rollers 37 carried by vertical members 38 and 39 of the framework 30. Ways for the roller 37 in the form shown, are plates 40 attached to the base 20.

One form of sensing device or position detector that has been found very satisfactory for the strip aligning apparatus is shown although it is to be understood that many types of such devices such as photo-electric cells, vacuum operated, other electrical systems, etc. are available for such uses. The particular device illustrated consists of a low pressure air stream 41 (see Fig. 1) passing over the edge of the strip of material. As the flow of air is altered by the change in position of the edge of the material, the oil cylinder 10 is activated to return the strip edge to the desired position.

One form of such a device is shown in the United States Patent No. 2,539,131, issued to D. T. Gundersen. This particular device that has been found to be very satisfactory with a relatively flat elongated nozzle opening 42 positioned transverse to the edge of the material with the edge being substantially at the center of the nozzle opening in the desired position. When the edge of the material moves to one side or the other of the nozzle opening 42, the change in pressure in the receiver mechanism of the apparatus actuates the oil cylinder 10 to cause the connecting rod 43 of the cylinder to be extended or retracted. The connecting rod 43 is pivotally attached at 44 to the framework 30. Consequently, as the connecting rod 43 is retracted or extended the framework 30 is rotated about the pivot point causing the longitudinal axis of the belt 7 to move out of alignment with the longitudinal axis of the skiver belt 2 and move the edge of the strip back to the center of the nozzle opening 42. At this point, the sensing device 9 returns the cylinder 10 to its normal position. Subsequently any change in the position of the strip edge causes the aligning device to activate the oil cylinder to keep the edge of the material in the predetermined position. As the framework 30 moves, the portion of the strip 3 that lies on the belt 7 is moved as a unit rather than at a localized point or points. This prevents undue distortion in portions of the strip with the result that the strip is placed undistorted on the belt of the skiver in the proper position for accurate skiving.

Although the aligning device has been described in combination with a tread skiving apparatus, it may be used in combination with any apparatus which requires that a moving web of material be positioned thereon in a fixed position. In each instance, it is desirable that the device is positioned immediately ahead of the moving surface of the apparatus.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. A strip aligning device for depositing a continuously moving web of material in a predetermined position on a moving surface, said position being determined by the position of the edge of said strip, said device comprising a belt mounted to swing in a plane parallel to the plane of the moving surface, said belt adapted to support and feed the rubber tread strip onto the moving surface, means to drive said belt at substantially the same speed as the moving surface, a sensing element activated when the edge of the strip of tread stock moves out of the predetermined position, means actuated by said sensing element to control the swing of the belt to return the edge of the strip of tread stock to the predetermined position thereby controlling the position of the strip on the moving surface.

2. A strip aligning device adapted to continuously deposit a strip of unvulcanized rubber or rubberized fabric on a moving surface in a predetermined position, said device comprising a belt mounted adjacent one end of said moving surface to swing in a plane parallel to said surface, driving means moving said belt at substantially the same speed as said surface, a detector mounted between said surface and belt in a position to be activated by the edge of the strip if the strip moves away from the predetermined position and control means actuated by said detector to swing said belt about to guide the strip in the predetermined position on said surface.

3. A strip aligning device for depositing a continuously moving strip of unvulcanized rubber tread stock in a predetermined position on a conveying belt, said position being determined by the position of the edge of said strip, said device comprising a second belt mounted to swing in a plane parallel to the plane of the conveying belt, said second belt adapted to support and feed the rubber tread strip onto the conveying belt, means to drive said second belt at substantially the same speed as the conveying belt, a sensing element activated when the edge of the strip of tread stock moves out of the predetermined position, means actuated by said sensing element to control the swing of the belt to return the edge of the strip of tread stock to the predetermined position thereby controlling the position of the strip on the conveying belt.

4. A strip aligning device adapted to continuously deposit a strip of unvulcanized rubber on a moving conveyor in a predetermined position, said device comprising a belt mounted adjacent one end of said conveyor to swing in a plane parallel to said conveyor, driving means moving said belt at substantially the same speed as said conveyor, a detector mounted between said conveyor and belt in a position to be activated by the edge of the strip if the strip moves away from the predetermined position and control means actuated by said detector to swing said belt about to guide the strip into the predetermined position on said conveyor.

References Cited in the file of this patent

UNITED STATES PATENTS

| | | |
|---|---|---|
| 1,133,297 | Lewis | Mar. 30, 1915 |
| 2,075,111 | Gulliksen | Mar. 30, 1937 |
| 2,121,665 | Hudson | June 21, 1938 |
| 2,216,108 | Brockway | Oct. 1, 1940 |
| 2,378,234 | Meyer | June 12, 1945 |
| 2,527,739 | Knobusch | Oct. 31, 1950 |
| 2,544,241 | Sternad | Mar. 6, 1951 |
| 2,592,469 | Rockhoff | Apr. 8, 1952 |
| 2,654,599 | Frisbie | Oct. 16, 1953 |
| 2,735,630 | Ziebolz | Feb. 21, 1956 |

FOREIGN PATENTS

| | | |
|---|---|---|
| 596,443 | Great Britain | Jan. 5, 1948 |